(12) United States Patent
Schiff

(10) Patent No.: US 6,424,831 B1
(45) Date of Patent: Jul. 23, 2002

(54) APPARATUS AND METHOD FOR PAGING A USER TERMINAL IN A SATELLITE COMMUNICATION SYSTEM

(75) Inventor: Leonard N. Schiff, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/281,834

(22) Filed: Mar. 30, 1999

(51) Int. Cl.$^7$ ................................................ H04Q 7/00
(52) U.S. Cl. ...................... 455/429; 455/12.1; 455/456; 455/433
(58) Field of Search ................................ 455/12.1, 13.1, 455/13.3, 13.4, 426, 427, 429, 456, 466, 458, 433, 434, 435, 515, 516; 342/352, 354, 357

(56) References Cited

U.S. PATENT DOCUMENTS

| 4,901,307 A | | 2/1990 | Gilhousen et al. | |
| 5,126,748 A | | 6/1992 | Ames et al. | |
| 5,369,681 A | * | 11/1994 | Boudreau et al. | ............ 455/456 |
| 5,463,400 A | * | 10/1995 | Tayloe | ........................ 455/12.1 |
| 5,506,886 A | | 4/1996 | Maine et al. | |
| 5,537,681 A | * | 7/1996 | Redden et al. | ............. 455/12.1 |
| 5,539,921 A | * | 7/1996 | Tayloe | ........................ 455/13.4 |
| 5,691,974 A | | 11/1997 | Zehavi et al. | |
| 5,809,396 A | * | 9/1998 | Armbruster et al. | ....... 455/12.1 |
| 5,920,284 A | | 7/1999 | Victor | |
| 5,924,042 A | * | 7/1999 | Sukamoto et al. | ........... 455/458 |
| 6,035,203 A | * | 3/2000 | Hanson | ........................ 455/458 |
| 6,058,308 A | * | 5/2000 | Kallin et al. | ................. 455/458 |
| 6,072,986 A | * | 6/2000 | Blanchard et al. | .......... 455/13.4 |

FOREIGN PATENT DOCUMENTS

| EP | 0501706 | 9/1992 |
| WO | 9405093 | 3/1994 |
| WO | 9621332 | 7/1996 |

* cited by examiner

Primary Examiner—Lester G. Kincaid
(74) Attorney, Agent, or Firm—Philip R. Wadsworth; Gregory D. Ogrod

(57) ABSTRACT

Apparatus and method for paging a user terminal (UT) using a satellite communications system having a gateway and one or more satellites, wherein each satellite produces a plurality (n) of beams and each beam includes a plurality of channels. The method of the present invention includes the step of recalling a first location of the UT, wherein the first location corresponds to a location of the UT at a first time $t_1$. In one embodiment, this is accomplished by performing a lookup in a table or database that includes location information for user terminals at different points in time. The method also includes the step of determining a first group ($g_1$) of beams which covers the first location of the UT at a second time $t_2$, where $g_1 < n$ and time $t_2$ is later in time than time $t_1$. A page is then sent from the gateway to the UT on a channel, such as a paging channel, of at least one beam of the first group of beams. In one embodiment, the page is sent on the paging channel of each of the first group of beams.

18 Claims, 9 Drawing Sheets

APPARATUS AND METHOD FOR PAGING A USER TERMINAL IN A SATELLITE COMMUNICATION SYSTEM

BACKGROUND OF THE INVENTION

I. Field of the Invention

The present invention relates generally to satellite communication systems, and more particularly, to an apparatus and method for reducing the number of paging channels used to page user terminals.

II. Related Art

Conventional satellite-based communication systems include gateways and one or more satellites to relay communication signals between the gateways and one or more user terminals. A gateway is an earth station having an antenna for transmitting signals to, and receiving signals from, communication satellites. A gateway provides communication links, using satellites, for connecting a user terminal to other user terminals or users of other communication systems, such as a public switched telephone network. A satellite is an orbiting receiver, repeater and regenerator used to relay information signals. A user terminal is a wireless communication device such as, but not limited to, a wireless telephone, a data transceiver, and a paging receiver. A user terminal can be fixed, portable, or mobile, such as a mobile telephone.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of beam-forming antennas. Each beam covers a particular geographic region within the footprint. Beams may be directed so that more than one beam from the same satellite covers the same specific geographic region.

Some satellite communications systems employ code division multiple access (CDMA) spread-spectrum signals, as disclosed in U.S. Pat. No. 4,901,307, issued Feb. 13, 1990, entitled "Spread Spectrum Multiple Access Communication System Using Satellite or Terrestrial Repeaters," and U.S. Pat. No. 5,691,974, issued Nov. 25, 1997, entitled "Method and Apparatus for Using Full Spectrum Transmitted Power in a Spread Spectrum Communication System for Tracking Individual Recipient Phase Time and Energy," both of which are assigned to the assignee of the present invention, and are incorporated herein by reference.

In satellite communication systems employing CDMA, separate communication links are used to transmit communication signals, such as data or traffic, to and from a gateway. The term "forward communication link" refers to communication signals originating at the gateway and transmitted to a user terminal. The term "reverse communication link" refers to communication signals originating at a user terminal and transmitted to the gateway.

On the forward link, information is transmitted from a gateway to a user terminal over one or more beams. These beams often comprise a number of so-called subbeams (also referred to as frequency division multiple access (FDMA) channels) covering a common geographic area, each occupying a different frequency band. More specifically, in a conventional spread-spectrum communication system, one or more preselected pseudorandom noise (PN) code sequences are used to modulate or "spread" user information signals over a predetermined spectral band prior to modulation onto a carrier signal for transmission as communication signals. PN spreading is a method of spread-spectrum transmission that is well known in the art, and produces a communication signal with a bandwidth much greater than that of the data signal. On the forward link, PN spreading codes or binary sequences are used to discriminate between signals transmitted by different gateways or over different beams, as well as between multipath signals. These codes are often shared by all communication signals within a given subbeam.

In a conventional CDMA spread-spectrum communication system, "channelizing" codes are used to discriminate between different user terminals within a satellite sub-beam on a forward link (sometimes referred to as CDMA channels). That is, each user terminal has its own orthogonal channel provided on the forward link by using a unique channelizing orthogonal code. Walsh functions are generally used to implement the channelizing codes, also known as Walsh codes. The channelizing codes divide a subbeam into orthogonal channels, also known as Walsh channels. A majority of the Walsh channels are traffic channels that provide messaging between a user terminal and a gateway. The remaining Walsh channels often include pilot, sync, and paging channels. Signals sent over the traffic channels are meant to be received by only one user terminal. In contrast, paging, sync, and pilot channels may be monitored by multiple user terminals.

When a user terminal is not involved in a communications session (that is, the user terminal is not receiving or transmitting traffic signals), the gateway can convey information to that particular user terminal using a signal known as a paging signal (also referred to herein as a page). Paging signals are often sent by the gateway to establish a communication link, to tell a user terminal that a call is coming in, to reply to a user terminal trying to access the system, and for registration of the user terminal. For example, when a call has been placed to a particular user terminal, the gateway alerts the user terminal by means of a paging signal. Additionally, if the gateway is sending a short message to a user terminal, such as a request for a location update of the user terminal, the gateway can send such a request by means of a paging signal. Paging signals are also used to distribute channel assignments and system overhead information. Paging signals are usually transmitted over paging channels, which are briefly discussed above. Each paging signal includes an identity number so that the user terminals listening to the paging channel know if the paging signal is addressed to them. If a paging signal is meant for multiple user terminals, the paging signal includes an identity number that corresponds to the multiple user terminals.

A user terminal can respond to a paging signal by sending an access signal or access probe over the reverse link (that is, the communications link originating at the user terminal and terminating at the gateway). The access signal is also used to register with a gateway, to originate a call, or to acknowledge a paging request by a gateway. The access signal is usually transmitted over channels specifically designated as access channels, which are briefly discussed above. The reverse link also includes traffic channels for providing messaging between a user terminal and a gateway.

If a user terminal is merely sending a location update in response to a location update request that is received from a gateway over a paging channel, the user terminal may send location update information as an access probe over an access channel. By using paging channels and access channels to convey short messages (such as location update requests and location update information), forward and reverse traffic channels are reserved for longer communications such as voice calls.

When a gateway sends a paging signal to a user terminal, the gateway usually does not know the location of the user terminal. Therefore, in contemporary satellite communications systems, the gateway usually sends a paging signal over many paging channels, one in each of several beams. At worst, the gateway sends the paging signal over a paging channel in every beam that is supported by the gateway serving the particular user terminal. It is generally not necessary to use a paging channel in every subbeam, as subbeam monitoring assignments within beams are usually known in advance, although this can be done as desired). This sending of a paging signal over many paging channels is often referred to as flood paging. Flood paging, though inefficient and wasteful, is relatively inexpensive when used to set up voice calls. This is because the resources used to flood page are relatively small compared to the resources used for a typical two or three minute voice call. More specifically, the total capacity and power used to flood page is relatively small compared to the total power and capacity used to support the voice call. Thus, flood paging, though not efficient, has proven useful in voice systems. However, flood paging may become unacceptable when used for setting up voice calls, if, for example, the number of call set up requests increases to the point where paging channel capacity becomes a scarce resource.

The inefficiencies of flood paging are not acceptable in many other types of messaging systems, such as in a position determination system where the response to a paging message may be a relatively short acknowledgment message and/or a location update message. This is because the resources used to flood page are quite large as compared to the information sent in response to the flood page. More specifically, the total power and capacity used to flood page is relatively large compared to the total power and capacity used to support the response to the flood page (for example, an acknowledgment or location update message).

An example of an industry in which position determination is particularly useful is the commercial trucking industry. In the commercial trucking industry an efficient and accurate method of vehicle position determination is in demand. With ready access to vehicle location information, a trucking company home base obtains several advantages. For example, a trucking company can keep a customer informed of location, route and estimated time of arrival of payloads. The trucking company can also use vehicle location information together with empirical data on the effectiveness of routing, thereby determining the most economically efficient routing paths and procedures.

In order to minimize the power and capacity used to track the location of a truck, a location update request can be sent to a user terminal (often referred to as a Mobile Communications Terminal or MCT in the trucking industry) within the truck periodically (for example, once every hour). To further save resources, the collection of location updates should be accomplished without utilizing traffic channels. To accomplish this, a location update request message can be sent as a paging signal over a paging channel. To further minimize the power and capacity used, the number of paging channels used to transmit the paging signal should be minimized for the reasons discussed above.

Thus, as discussed above, there is a need for an apparatus and method for reducing the number of paging channels used to page a user terminal. Even though the initial need for the reduction of flood paging was inspired by the reduction of flood paging in a position determination system, the system and method of the present invention is useful in any type of satellite communications system that uses channels (identical to or similar to paging channels) for conveying information to a user terminal that is not involved in a communications session. For example, the present invention is useful in a voice communications system that uses paging signals sent over paging channels to set up a voice call. This invention is especially useful in voice communications systems where the capacity of the paging channels is close to being exhausted due to an increasing number of call setup requests. Additionally, this invention is useful in a system where common paging channels are used for multiple applications, including but not limited to setting up voice communications and requesting location updates.

SUMMARY OF THE INVENTION

The present invention is directed toward an apparatus and method for paging a user terminal (UT) using a satellite communications system having a gateway and one or more satellites, wherein each satellite produces a plurality (n) of beams and each beam includes a plurality of channels. The method of the present invention includes the step of recalling a first location of the UT, wherein the first location corresponds to a location of the UT at a first time $t_1$. In one embodiment, this is accomplished by performing a lookup in a table or database that includes location information for user terminals at different points in time. The method also includes the step of determining or selecting a first group ($g_1$) of beams to use for paging which covers the first location of the UT at a second time $t_2$, where $g_1<n$, and time $t_2$ is later in time than time $t_1$ ($t_2>t_1$). A page is then sent from the gateway to the UT on at least one channel, such as a paging channel, of at least one beam of the first group of beams. In one embodiment the page is sent on the paging channel of each of the first group of beams. In one embodiment, the step of sending a page from the gateway to the UT includes requesting a location update from the UT at the second time $t_2$.

In one embodiment of the present invention, the step of determining a first group of beams to use includes the steps of determining a first area having a first radius originating at the first location and determining which beams have a coverage area that intersects the first area. The first radius can be a predetermined value or can be a function of a time period between time $t_2$ and time $t_1$.

If the UT receives the page from the gateway, then the UT sends a message acknowledging receipt of the page to the gateway. In one embodiment, this message includes information relating to the location of the UT at the second time $t_2$. In an another embodiment, the gateway determines a location of the UT at the second time $t_2$ based on characteristics of the acknowledgment message.

In another step of the present invention, it is determined whether or not the gateway has received an acknowledgment message from the UT indicating that the UT has received the page. If the gateway does not receive the acknowledgment message from the UT within a predetermined amount of time, then a second area having a second radius is determined or selected. The second radius is larger than the first radius and, therefore, the second area is larger than the first area. A second group ($g_2$) of beams, where $g_2<n$, having a coverage area that intersects the second area is then determined or selected. In one embodiment, a second page is sent from the gateway to the UT on a channel of each of the second group of beams. Preferably, the second page is sent to the UT concurrently over each beam in the second group and in the first group of beams. Alternatively, the second page is sent to the UT over each beam in the second group but not in the first group of beams. However, this latter approach generally requires short response times and may not adequately account for temporary signal blockages.

BRIEF DESCRIPTION OF THE DRAWINGS

The features, objects, and advantages of the present invention will become more apparent from the detailed description set forth below when taken in conjunction with the drawings in which like reference characters identify corresponding elements throughout and wherein.

DETAILED DESCRIPTION OF THE PREFERRED EMBODIMENTS

I. Introduction

The present invention is particularly suited for use in communications systems employing low Earth orbit (LEO) satellites, wherein the satellites are not stationary with respect to a point on the surface of the Earth. However, the invention is also applicable to satellite systems in which the satellites travel in non-LEO orbits.

A preferred embodiment of the invention is discussed in detail below. While specific steps, configurations and arrangements are discussed, it should be understood that this is done for illustrative purposes only. A preferred application is in CDMA wireless spread spectrum communication systems.

II. An Exemplary Satellite Communications System

Figure 1A:
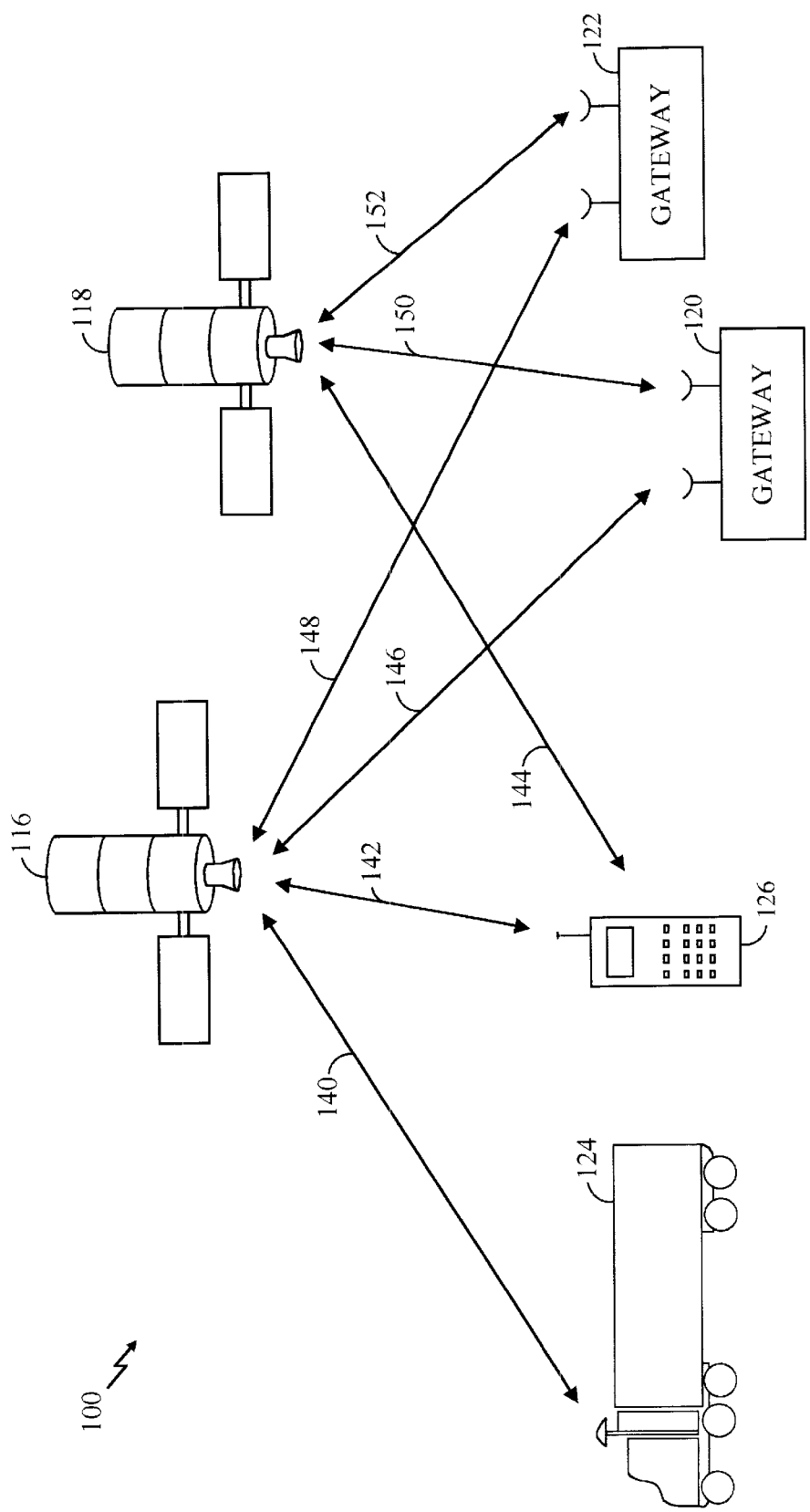
FIG. 1A illustrates an exemplary wireless communication system in which the present invention is useful.

An exemplary wireless communication system in which the present invention is useful is illustrated in FIG. 1A. It is contemplated that this communication system uses CDMA type communication signals, but this is not required by the present invention. In a portion of a communication system 100 illustrated in FIG. 1A, two satellites 116 and 118, and two associated gateways, base stations, or hubs 120 and 122 are shown for effecting communications with two remote user terminals 124 and 126. The total number of gateways and satellites in such systems depends on desired system capacity and other factors well understood in the art.

User terminals 124 and 126 each include a wireless communication device such as, but not limited to, a cellular or satellite telephone, a data transceiver, or a paging or position determination receiver, and can be hand-held or vehicle-mounted as desired. In FIG. 1A, user terminal 124 is illustrated as a vehicle mounted device and user terminal 126 is illustrated as a hand-held telephone. However, it is also understood that the teachings of the invention are applicable to fixed units where remote wireless service is desired. User terminals are sometimes also referred to as subscriber units, mobile stations, mobile units, or simply as "users" or "subscribers" in some communication systems, depending on preference.

Generally, beams from satellites 116 and 118 cover different geographical areas in predefined beam patterns. Beams at different frequencies, also referred to as FDMA channels or "sub-beams," can be directed to overlap the same region. It is also readily understood by those skilled in the art that beam coverage or service areas for multiple satellites might be designed to overlap completely or partially in a given region depending on the communication system design and the type of service being offered, and whether space diversity is being achieved.

A variety of multi-satellite communication systems have been proposed with an exemplary system employing on the order of 48 or more satellites, traveling in eight different orbital planes in LEO orbits for servicing a large number of user terminals. However, those skilled in the art will readily understand how the teachings of the present invention are applicable to a variety of satellite system and gateway configurations, including other orbital distances and constellations.

In FIG. 1A, some possible signal paths are illustrated for communications between user terminals 124 and 126 and gateways 120 and 122, through satellites 116 and 118. The satellite-user terminal communication links between satellites 116 and 118 and user terminals 124 and 126 are illustrated by lines 140, 142 and 144. The gateway-satellite communication links, between gateways 120 and 122 and satellites 116 and 118, are illustrated by lines 146, 148, 150 and 152. Gateways 120 and 122 may be used as part of one or two-way communication systems or simply to transfer messages or data to user terminals 124 and 126.

Figure 1B:
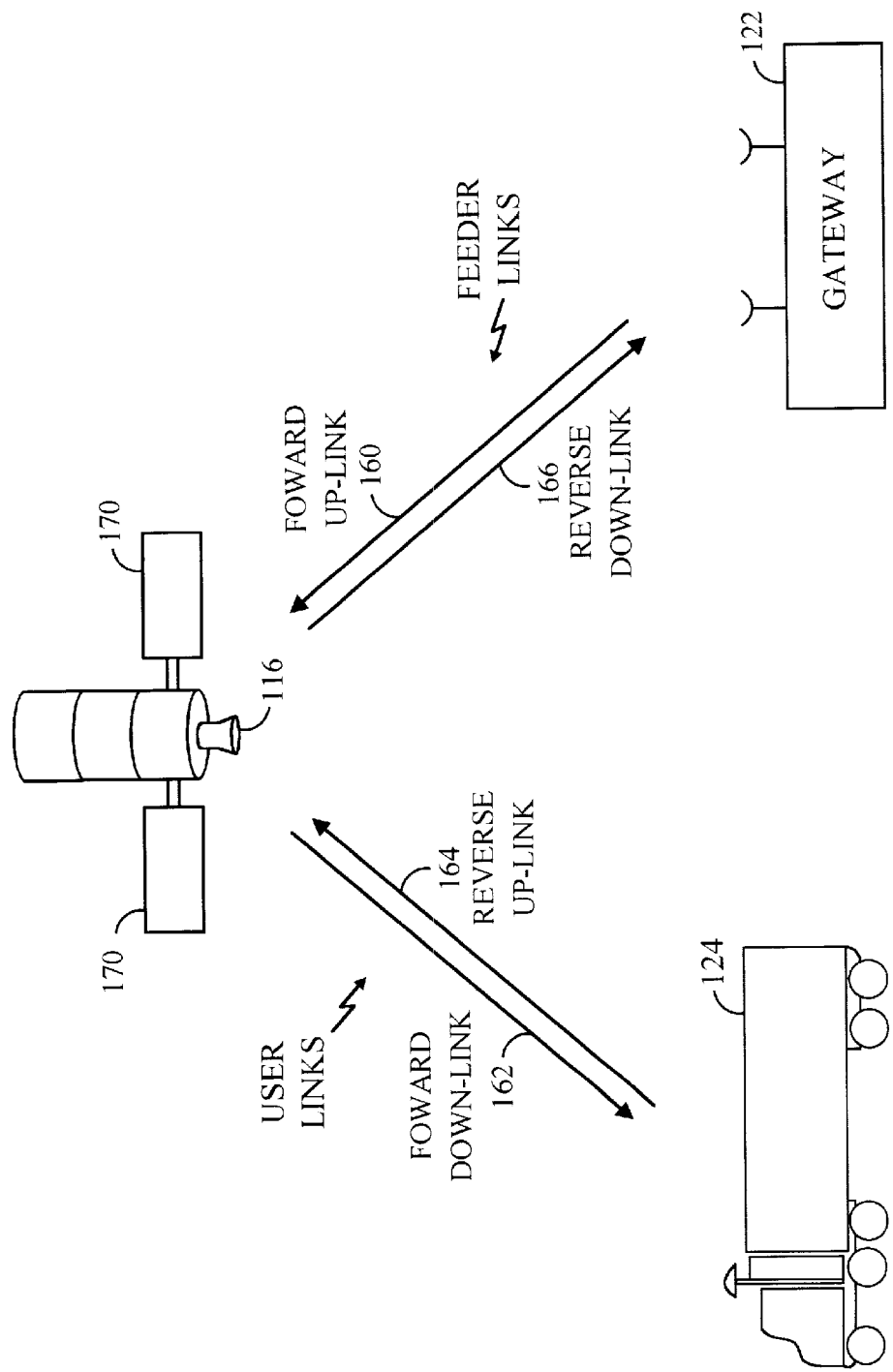
FIG. 1B illustrates exemplary communication links between a gateway and a user terminal.

FIG. 1B provides additional details of the communications between gateway 122 and user terminal 124 of communication system 100. Communication links between user terminal 124 and satellite 116 are generally termed user links and the links between gateway 122 and satellite 116 are generally termed feeder links. Communications proceeds in a "forward" direction from gateway 122 to satellite 116 on forward feeder link 160 and then down from satellite 116 to user terminal 124 on forward user link 162. In a "return" or "reverse" direction, communication proceeds up from user terminal 124 to satellite 116 on reverse user link 164 and then down from satellite 116 to gateway 122 on reverse feeder link 166.

In an example embodiment, information is transmitted by gateway 122 on forward links 160, 162 utilizing frequency division and polarization multiplexing. The frequency band used is divided up into predetermined number of frequency "channels" or "beams." For example, the frequency band is divided into 8 individual 16.5 MHz "channels" or "beams" using right hand circular polarization (RHCP) and 8 individual 16.5 MHz "channels" or "beams" using left hand circular polarization (LHCP). These frequency "channels" or "beams" are further made up of a predetermined number of frequency division multiplexed (FDM) "subchannels" or "subbeams." For example, the individual 16.5 MHz channels may in turn be made up of up to 13 FDM "subchannels" or "subbeams", each of 1.23 MHz bandwidth. Each FDM subbeam can include multiple orthogonal channels which are typically established using Walsh codes (also referred to as Walsh channels). A majority of the orthogonal channels are traffic channels that provide messaging between user terminals 124 and gateway 122. The remaining orthogonal channels include pilot, sync and paging channels.

The pilot channel is transmitted by gateway 122 on forward link 160, 162 and is used by user terminal 124 to obtain initial system synchronization, and time, frequency and phase tracking for acquiring transmitted signals in beams or a subbeam (CDMA carrier).

The sync channel is transmitted by gateway 122 on forward link 160, 162 and includes a repeating sequence of information which user terminal 124 can read after finding a pilot channel. This information is needed to synchronize user terminal 124 to the gateway 122 assigned to that subbeam. Paging channels are often used by gateway 122 on forward link 160, 162 to establish a communication link, to tell user terminal 124 that a call is coming in, to reply to a user terminal trying to access the system, and for registration of the user terminal. Additionally, as will be explained in further detail below, paging channels can also be used for sending short messages, such as a position update request, to user terminal 124.

The traffic channels are assigned on the forward and reverse links when a communication link is requested (for example, when a call is being placed). Messaging transfers between user terminal 124 and gateway 122 during a conventional phone call is accomplished using a traffic channel.

In the reverse direction, user terminal 124 transmits information to satellite 116 over user link 164. Satellite 116 receives these signals from multiple user terminals (over link 164) and frequency division multiplexes them together for the satellite-to-gateway feeder link 166. Reverse link 164 contains traffic channels and access channels.

An access channel is used by user terminal 124 on reverse link 164, 166 to "access" gateway 122. Access channels, which are well-known in the relevant art, provide communications from a user terminal to a gateway when the user terminal is not using a traffic channel. This could be to register on the system, to establish a communication link, to place a call, or to acknowledge a page sent by gateway 122. Additionally, as will be explained in further detail below, an access channel can also be used for sending a short message, such as a position update, from user terminal 124 to gateway 122. One or more access channels are generally paired with a paging channel to provide a more efficient means of user terminals selecting channels to use in responding to pages. In CDMA systems, each access channel on a reverse link is generally distinguished by a different PN code, which may be much different in length or chipping rate than other PN codes used in spreading communication signals in the communication system. User terminal 124 responds to a page message by transmitting on one of the associated access channels. Similarly, gateway 122 responds to transmission on a particular access channel by a message on the access channel's associated paging channel.

III. User Terminal Transceiver

Figure 2:
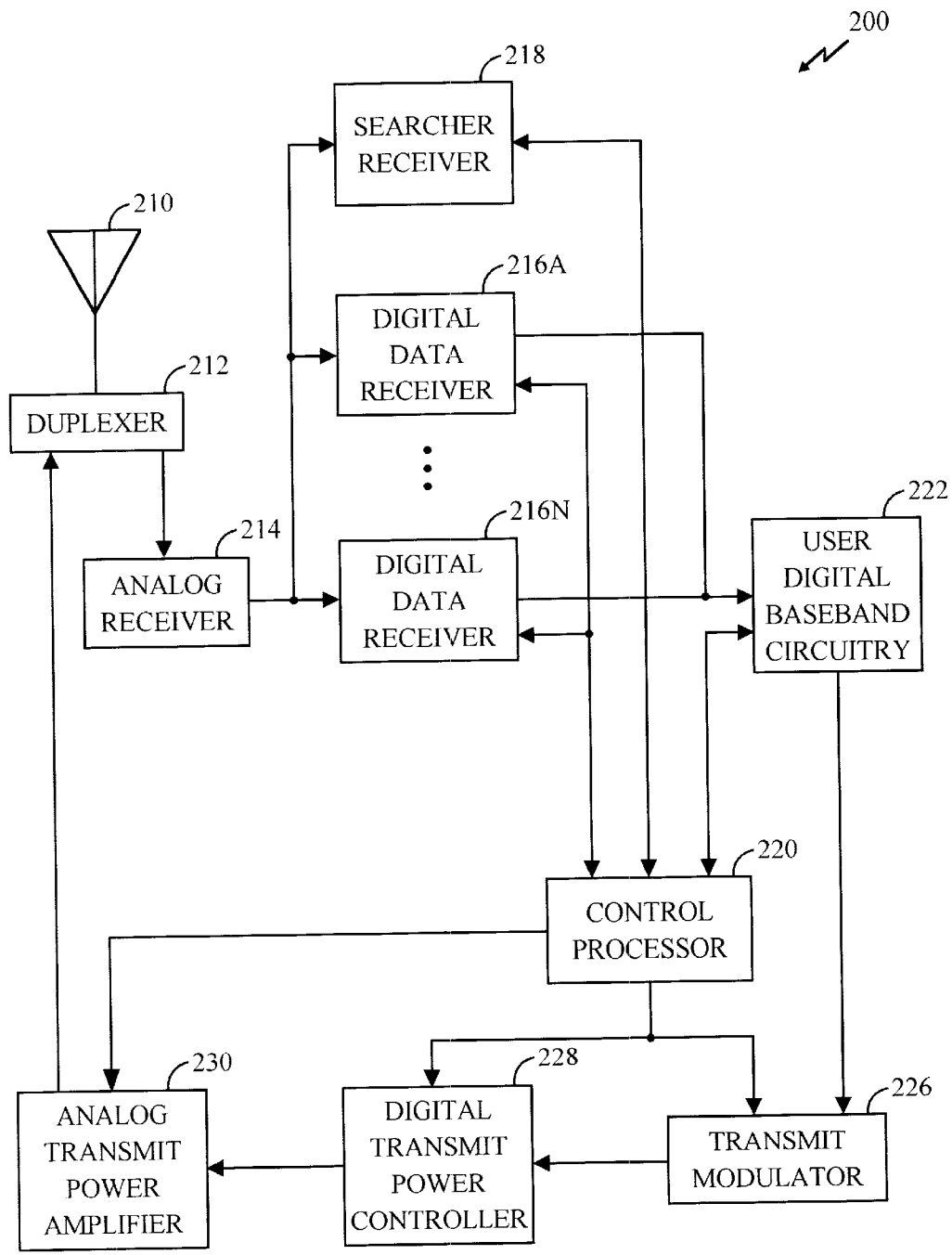
FIG. 2 illustrates an exemplary transceiver for use in a user terminal.

An exemplary transceiver 200 for use in user terminals 124 and 126 is illustrated in FIG. 2. Transceiver 200 uses at least one antenna 210 for receiving communication signals, which are transferred to an analog receiver 214, where they are down-converted, amplified, and digitized. A duplexer element 212 is often used to allow the same antenna to serve both transmit and receive functions. However, some systems employ separate antennas for operating at different transmit and receive frequencies.

The digital communication signals output by analog receiver 214 are transferred to at least one digital data receiver 216A and at least one searcher receiver 218. Additional digital data receivers 216B–216N can be used to obtain desired levels of signal diversity, depending on the acceptable level of transceiver complexity, as would be apparent to one skilled in the relevant art.

At least one user terminal control processor 220 is coupled to digital data receivers 216A–216N and searcher receiver 218. Control processor 220 provides, among other functions, basic signal processing, timing, power and handoff control or coordination, and selection of frequency used for signal carriers. Another basic control function often performed by control processor 220 is the selection or manipulation of pseudonoise (PN) code sequences or orthogonal functions to be used for processing communication signal waveforms. Signal processing by control processor 220 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 216A–216N are coupled to digital baseband circuitry 222 within the user terminal. User digital baseband circuitry 222 comprises processing and presentation elements used to transfer information to and from a user terminal. That is, signal or data storage elements, such as transient or long term digital memory; input and output devices such as display screens, speakers, keypad terminals, and handsets; A/D elements, vocoders and other voice and analog signal processing elements; and the like, all form parts of the user digital baseband circuitry 222 using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communications signal originating with the user terminal, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a power controller 228 which provides output power control to a transmit power amplifier 230 for final transmission of the output signal from antenna 210 to a gateway.

Transceiver 200 can also employ a precorrection element (not shown) in the transmission path to adjust the frequency of the outgoing signal. This can be accomplished using well known techniques of up- or down-conversion of the transmission waveform. In the alternative, a precorrection element (not shown) can form part of a frequency selection or control mechanism for the analog up-conversion and modulation stage (230) of the user terminal so that an appropriately adjusted frequency is used to convert the digital signal to a desired transmission frequency in one step. Transceiver 200 can also employ a precorrection element (not shown) in the transmission path to adjust the timing of the outgoing signal. This can be accomplished using well known techniques of adding or subtracting delay in the transmission waveform.

Digital receivers 216A–N and searcher receiver 218 are configured with signal correlation elements to demodulate and track specific signals. Searcher receiver 218 is used to search for pilot signals, or other relatively fixed pattern strong signals, while digital receivers 216A–N are used to demodulate other signals associated with detected pilot signals. However, a data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to control processor 220 for signals being demodulated.

Control processor 220 uses such information to determine to what extent the received signals are offset from the oscillator frequency, when scaled to the same frequency band, as appropriate. This and other information related to frequency errors and Doppler shifts can be stored in a storage or memory element 236, as desired.

IV. Gateway Transceiver

Figure 3:
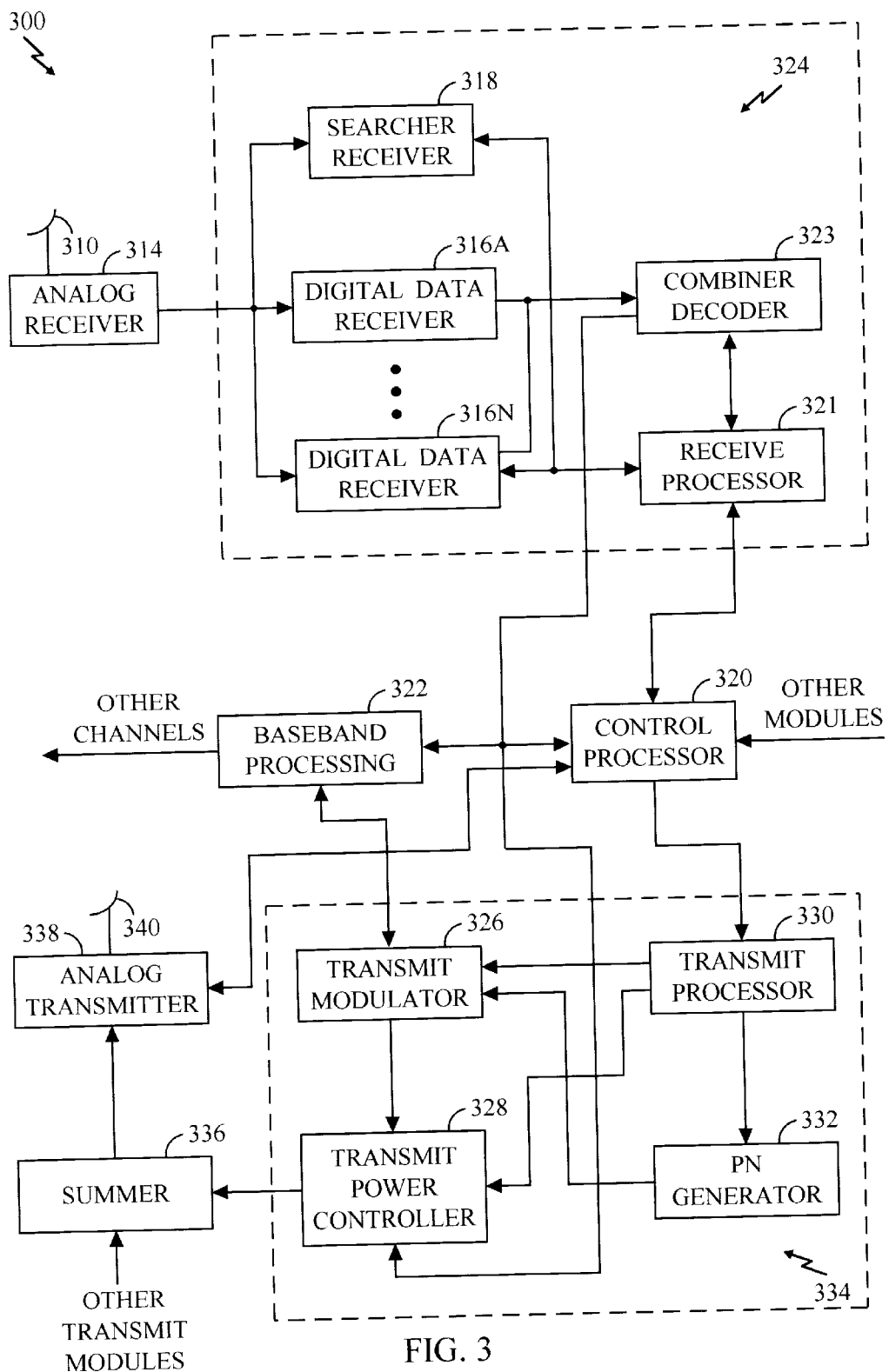
FIG. 3 illustrates exemplary transceiver apparatus for use in a gateway.

An exemplary transceiver apparatus 300 for use in gateways 120 and 122 is illustrated in FIG. 3. The portion of gateway 120, 122 illustrated in FIG. 3 has one or more analog receivers 314 connected to an antenna 310 for receiving communication signals which are then down-converted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communications between a gateway 120,122 and one user terminal 124, 126, although certain variations are known in the art. One analog receiver 314 can provide inputs for many digital receiver modules 324, and a number of such modules are often used in gateways 120, 122 to accommodate all of the satellite beams and possible diversity mode signals being handled at any given time. Each digital receiver module 324 has one or more digital data receivers 316 and a searcher receiver 318. Searcher receiver 318 generally searches for appropriate diversity modes of signals other than pilot signals. Where implemented in the communication system, multiple digital data receivers 316A–316N are used for diversity signal reception.

The outputs of digital data receivers 316 are provided to subsequent baseband processing elements 322 comprising apparatus well known in the art and not illustrated in further detail here. Exemplary baseband apparatus includes diversity combiners and decoders to combine multipath signals into one output for each user. Exemplary baseband apparatus also includes interface circuits for providing output data to a digital switch or network. A variety of other known elements such as, but not limited to, vocoders, data modems, and digital data switching and storage components may form a part of baseband processing elements 322. These elements operate to control or direct the transfer of data signals to one or more transmit modules 334.

Signals to be transmitted to user terminals are each coupled to one or more appropriate transmit modules 334. A conventional gateway uses a number of such transmit modules 334 to provide service to many user terminals 124, 126 at a time, and for several satellites and beams at a time. The number of transmission modules 334 used by gateway 120, 122 is determined by factors well known in the art, including system complexity, number of satellites in view, user capacity, degree of diversity chosen, and the like.

Each transmit module 334 includes a transmit modulator 326 which spread-spectrum modulates data for transmission. Transmit modulator 326 has an output coupled to a digital transmit power controller 328, which controls the transmission power used for the outgoing digital signal. Digital transmit power controller 328 applies a minimum level of power for purposes of interference reduction and resource allocation, but applies appropriate levels of power when needed to compensate for attenuation in the transmission path and other path transfer characteristics. At least one PN generator 332 is used by transmit modulator 326 in spreading the signals. This code generation can also form a functional part of one or more control processors or storage elements used in gateway 122, 124.

The output of transmit power controller 328 is transferred to a summer 336 where it is summed with the outputs from other transmit modules. Those outputs are signals for transmission to other user terminals 124, 126 at the same frequency and within the same beam as the output of transmit power controller 328. The output of summer 336 is provided to an analog transmitter 338 for digital-to-analog conversion, conversion to the appropriate RF carrier frequency, further amplification and output to one or more antennas 340 for radiating to user terminals 124, 126. Antennas 310 and 340 may be the same antennas depending on the complexity and configuration of the system.

At least one gateway control processor 320 is coupled to receiver modules 324, transmit modules 334, and baseband circuitry 322; these units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, orthogonal code sequences, and specific transmitters and receivers for use in user communications.

Control processor 320 also controls the generation and power of pilot, synchronization, and paging channel signals and their coupling to transmit power controller 328. The pilot channel is simply a signal that is not modulated by data, and may use a repetitive unchanging pattern or non-varying frame structure type (pattern) or tone-type input to transmit modulator 326. That is, the orthogonal function, Walsh code, used to form the channel for the pilot signal generally has a constant value, such as all 1's or 0's, or a well known repetitive pattern, such as a structured pattern of interspersed 1's and 0's. This effectively results in transmitting only the PN spreading codes applied from PN generator 332.

While control processor 320 can be coupled directly to the elements of a module, such as transmit module 324 or receive module 334, each module generally comprises a module-specific processor, such as transmit processor 330 or receive processor 321, which controls the elements of that module. Thus, in a preferred embodiment, control processor 320 is coupled to transmit processor 330 and receive processor 321, as shown in FIG. 3. In this manner, a single control processor 320 can control the operations of a large number of modules and resources more efficiently. Transmit processor 330 controls generation of, and signal power for, pilot, sync, paging signals, traffic channel signals, and any other channel signals and their respective coupling to power controller 328. Receiver processor 321 controls searching, PN spreading codes for demodulation and monitoring received power.

For certain operations, such as shared resource power control, gateways 120 and 122 receive information such as received signal strength, frequency measurements, or other received signal parameters from user terminals in communication signals. This information can be derived from the demodulated outputs of data receivers 316 by receive processors 321. Alternatively, this information can be detected as occurring at predefined locations in the signals being monitored by control processor 320, or receive processors 321, and transferred to control processor 320. Control processor 320 uses this information to control the timing and frequency of signals being transmitted and processed using transmit power controllers 328 and analog transmitter 338.

V. Satellite Beam Patterns

Figure 4:
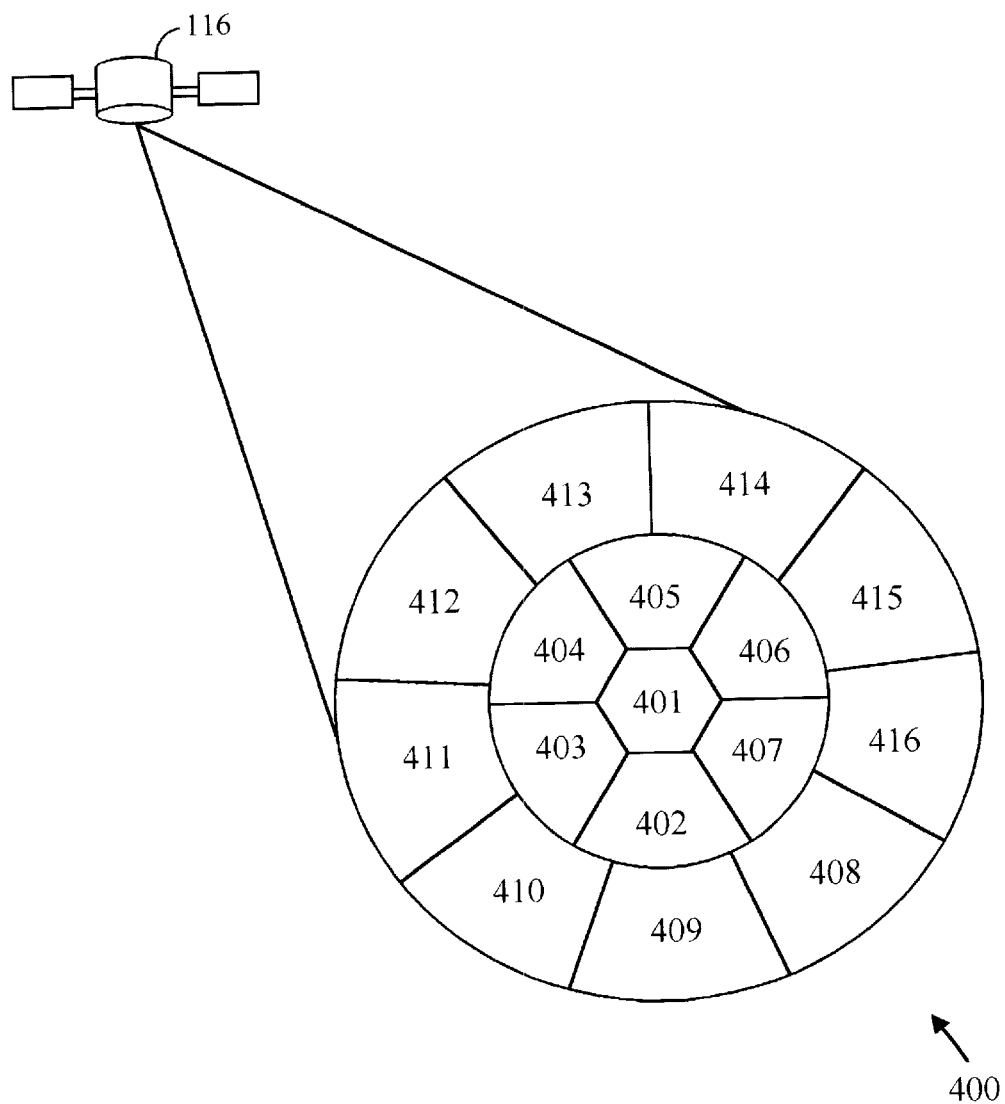
FIG. 4 illustrates an exemplary satellite footprint.

Generally, beams from satellites 116 and 118 cover different geographical areas in predefined beam patterns. Satellite beams are formed by, for example, a phased-array beam forming antenna, as would be apparent to one skilled in the relevant art. FIG. 4 illustrates an exemplary satellite beam pattern, also known as a footprint. As shown in FIG. 4, the exemplary satellite footprint 400 includes sixteen beams 401–416. More specifically, satellite footprint 400 includes an inner beam (beam 401), middle beams (beams 402–407), and outer beams (beams 408–416). Each beam 401–416 covers a specific geographical area, although there usually is some beam overlap. These specific geographic areas can be several hundred miles across. Additionally, beams at different frequencies, also referred to as FDMA channels, CDMA channels, or "sub-beams," can be directed to overlap the same region. Beam coverage or service areas for multiple satellites might be designed to overlap completely or partially in a given region depending on the communication system design and the type of service being offered, and whether space diversity is being achieved.

In a preferred embodiment of the present invention, different beam patterns are employed for the forward and reverse communications links. Exemplary alternate forward and reverse link beam patterns are illustrated for example in U. S. patent application Ser. No.: 08/723,723, entitled "Ambiguity Resolution For Ambiguous Position Solutions Using Satellite Beams," filed Sep. 30, 1996, now allowed, and incorporated herein by reference. However, the beam patterns of the forward and reverse communications links can be the same without departing from the spirit and scope of the present invention.

VI. Preferred Embodiment of the Invention

A preferred embodiment of the present invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination.

As discussed above, there is a need for a system and method for reducing the number of paging channels used to page user terminals. As discussed above, paging channels are used for sending information to a user terminal that is not in a communications session. For example, paging channels are often used by gateway 122 on forward link 160, 162 to establish a communication link, to tell user terminal 124 that a call is coming in, to reply to a user terminal trying to access the system, and for registration of user terminal 124. In a preferred embodiment, the paging channels are used to send a location update request message from gateway 122 to user terminal 124.

Figure 5A:
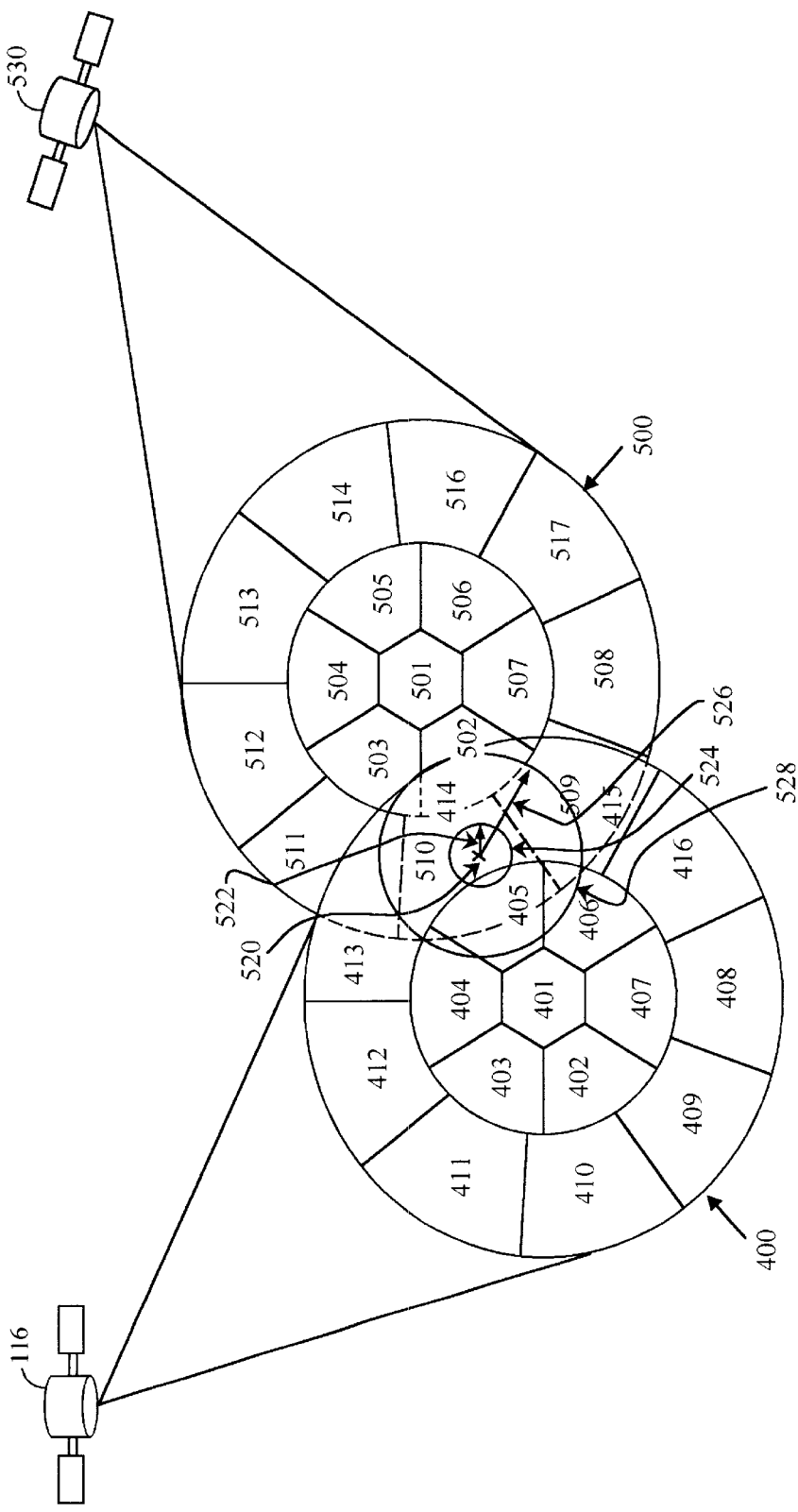
FIGS. 5A–5C illustrate exemplary satellite footprints that are useful for explaining an embodiment of the present invention.
Figure 5C:
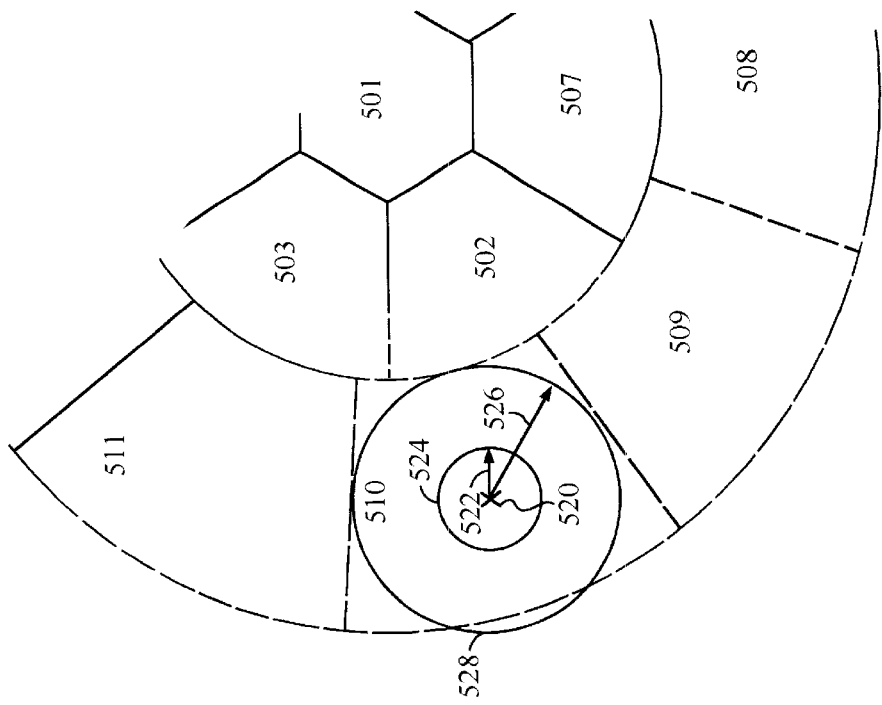
Figure 5B:
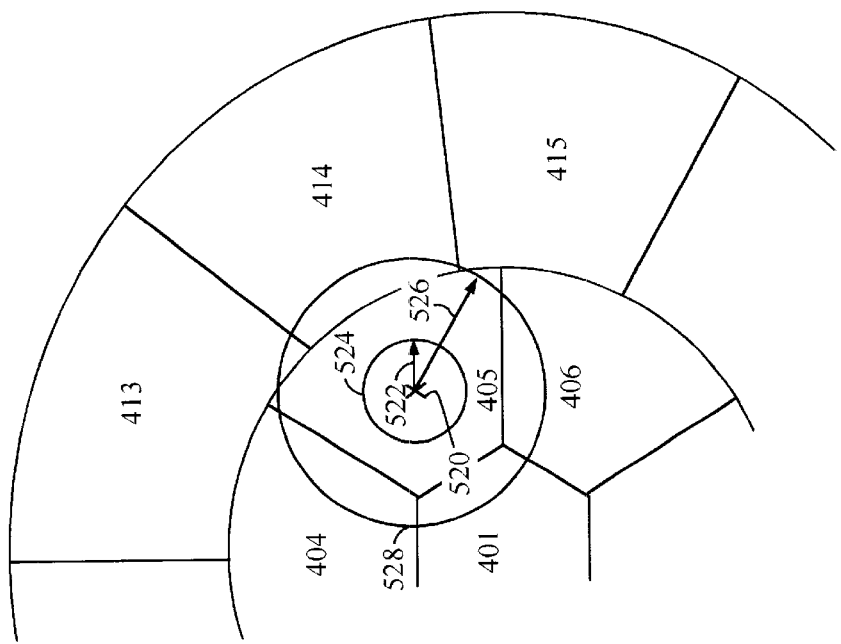

The inventive apparatus and method of reducing the number of paging channels used to page a user terminal is described herein with reference to FIGS. 5A–5C. FIG. 5A illustrates the beam coverage areas of satellites 116 and 530 at a time $t_2$. In a preferred embodiment, satellites 116 and 530 are moving on a scheduled basis and illuminating different regions on the surface of the Earth at different points in time. More specifically, in a preferred embodiment, satellites 116 and 530 are two satellites of a multiple satellite system wherein the satellites orbit such that they are not stationary with respect to a point on the surface of the Earth. The present invention is also useful in a geosynchronous satellite communications system where the satellites could indefinitely cover substantially the same geographic regions.

Assume that gateway 122 had communicated with user terminal 124 at a time $t_1$ and thereby knows the location of user terminal 124 at time $t_1$. How gateway 122 had determined the location of user terminal 124 at time $t_1$ is discussed in further detail below. Now, assume that gateway 122 needs to page user terminal 124 at a time $t_2$, where time $t_2$ is later in time than time $t_1$. The purpose of the page may be for any of the uses discussed above including to inform user terminal 124 that a call is coming in or to request a location update from user terminal 124. As discussed above, in a conventional satellite communications system, gateway 122 would flood page, by sending a page over many, possibly all, of its paging channels because it does not know the location of user terminal 124 at time $t_2$. That is, a page is transmitted on a given frequency, one channel, on all beams of all satellites, based on knowing which FDMA channel a user terminal is listening on. The present invention avoids this flood paging by taking advantage of gateway 122 having knowledge of the location of user terminal 124 at a previous point in time, time $t_1$. Before discussing further details of the present invention, below is a brief discussion of how gateway 122 could have determined the location of user terminal 124 at time $t_1$.

Gateway 122 could have determined the location of user terminal 124 at time $t_1$ in a number of ways. For example, gateway 122 may have calculated the location of user terminal 124 at time $t_1$ based on information sent from user terminal 124 to gateway 122. This information may have been sent from user terminal 124 to gateway 122 when, for example, user terminal 122 registered with gateway 122, user terminal 122 attempted to initiate a call, and the like. Examples of systems and methods that can be used to determine a user terminal's location are disclosed in U.S. Pat. No. 5,126,748, issued Jun. 30, 1992, entitled "Dual Satellite Navigation System And Method," U.S. patent application Ser. No. 08/732,725, filed Jun. 23, 1998, entitled "Unambiguous Position Determination Using Two Low-Earth Orbit Satellites," U.S. patent application Ser. No. 08/732,722, filed Sep. 30, 1996, entitled "Passive Position Determination Using Two Low-Earth Orbit Satellites," and U.S. patent application Ser. No. 08/723,751, filed Sep. 30, 1996, entitled "Position determination Using One Low-Earth Orbit Satellite," each of which is assigned to the assignee of the present invention, and is incorporated herein by reference. These patents and applications discuss determining the location of a user terminal using information such as characteristics of communications signals transmitted to and from the user terminal and known positions and velocities of satellites. It is noted that the term "position" and "location" are used interchangeably herein.

Alternatively, user terminal 124 may have provided gateway 122 with its location at time $t_1$. User terminal 124 may have used any available method for determining its location at time $t_1$. In one embodiment, user terminal 124 includes a Global Positioning Satellite (GPS) receiver, which is well known in the art. Using the GPS receiver, user terminal 124 can determine and forward its location to gateway 122. User terminal 124 may also have determined its location using any other system or method such as a conventional LORAN-C system. User terminal 124 can forward location information to gateway 122 as an access probe on an access channel, embedded within other signals, or as a separate signal. In a preferred embodiment, user terminal 124 forwards the location information in the same access probe that acknowledges receipt of the page. The following features of the present invention apply regardless of how gateway 122 learns of the location of user terminal 124 at time $t_1$.

Referring again to FIG. 5A, footprints 400 and 500 illustrate the beam coverage areas of satellites 116 and 530, respectively, at time $t_2$. Footprint 400 includes sixteen beams 401–416, as discussed above, and footprint 500 includes sixteen beams 501–516. For the sake of clarity, portions of footprint 500 that overlap footprint 400 are shown as dotted lines. Location 520 (designated by an "X") is the location of user terminal 124 at time $t_1$. As discussed above, gateway 122 has knowledge of location $t_1$.

As shown in FIG. 5A, at time $t_2$ location 520 is within the beam coverage area of both beam 405 (of satellite 116) and beam 510 (of satellite 530). By showing footprints 400 and 500 separately, FIGS. 5B and 5C make this even more clear. More specifically, FIG. 5B shows the coverage of footprint 400 and FIG. 5C shows the coverage of footprint 500, both at time $t_2$. If satellites 116 and 530 are geostationary satellites then the coverage of footprints 400 and 500 at time $t_1$ and $t_2$ would be substantially the same. However, if satellites 116 and 530 are non-geostationary satellites, as discussed above, then the coverage area of footprints 400 and 500 would be different at time $t_1$ than shown in FIGS. 5A–5C. Further, depending on the time between time $t_1$ and time $t_2$, the beam coverage areas of satellite 116 (footprint 116) and satellite 530 (footprint 500) may not have overlapped location 520 at time $t_1$.

The present invention takes advantage of gateway 122 knowing the location of user terminal 124 at a previous point in time. More specifically, by knowing the location 520 of user terminal 124 at time $t_1$, and by assuming that user terminal 124 could have only traveled a limited distance in the time period between time $t_1$ and time $t_2$, gateway 122 can hypothesize which beams cover user terminal 124 at time $t_2$. For example, if time $t_1$ was one hour prior to time $t_2$, it can be assumed that user terminal 124 did not travel any further than 80 miles in any direction from its location at time $t_1$. Using such an assumption, gateway 122 can hypothesize which beams cover user terminal 124 at time $t_2$. More specific details of the present invention are described below with reference to the flow charts in FIGS. 6 and 7.

Figure 6:
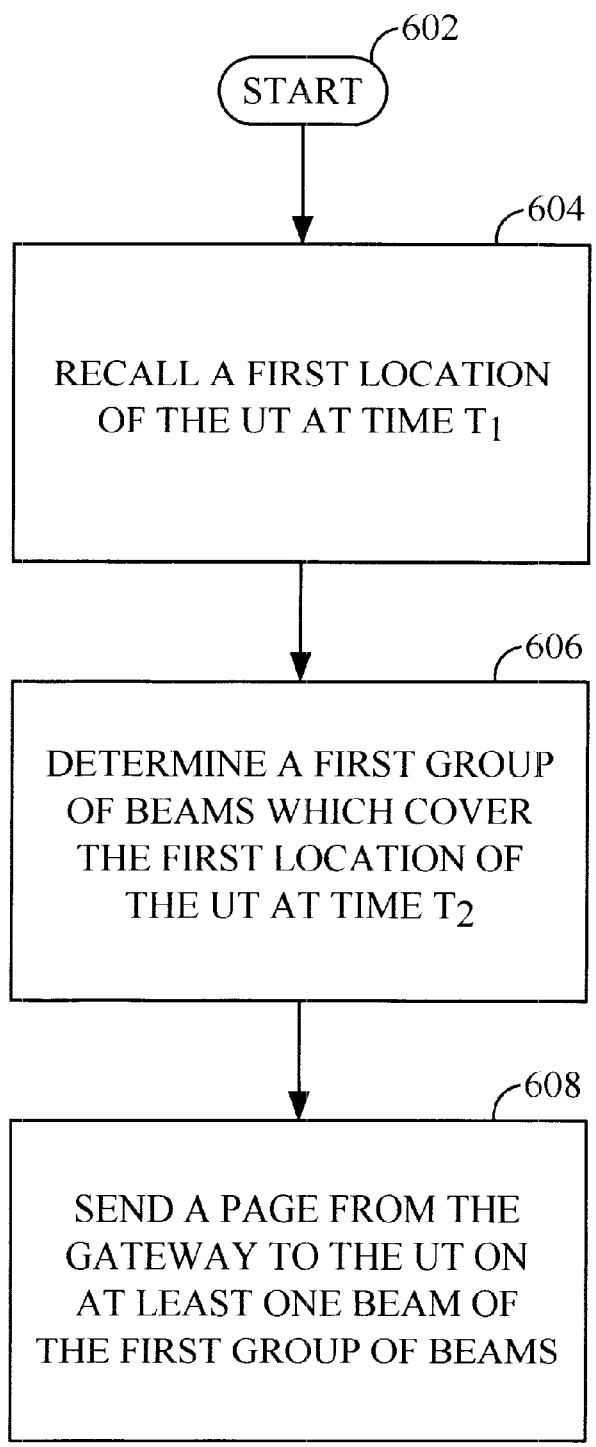
FIG. 6 is a flowchart depicting the high level operation of an embodiment of the present invention.

FIG. 6 provides a high level description of a preferred embodiment of the present invention. The first step, 604, is recalling the location of user terminal 124 at time $t_1$. This can be accomplished by performing a lookup in a table, databse, information storage, or memory location that is used to store location information of user terminals at different points in time. The location of user terminal 124 at time $t_1$ shall be referred to herein as first location 520. First location 520 could have been determined using any method including those discussed above.

In step 606, using knowledge of the satellite constellation, including the beam coverage areas of the satellites at different points in time, a determination is made (at gateway 122 or at some other location that is in communications with gateway 122, such as a system command or control center) of which beams cover first location 520 at time $t_2$. The beams which cover first location 520 at time $t_2$ shall be referred to herein as the first group of beams, designated $g_1$.

As discussed above, if the satellite constellation is geosynchronous then the same beams that covered first location 520 at time $t_1$ would also cover first location 520 at time $t_2$. If the satellite constellation is not geosynchronous, then different beams would probably cover first location 520 at time $t_2$ as compared to at time $t_1$ (unless the period between time $t_2$ and time $t_1$ is short, for example, a few seconds, or so long as to allow a compete orbit traversal by the satellite).

In step 608, once it is determined which beams cover first location 520 at time $t_2$ (that is, the first group of beams are determined), gateway 122 sends a page to user terminal 124 over at least one channel of at least one beam of the first group of beams. In a preferred embodiment, when gateway 122 does not know which paging channel user terminal 124 is monitoring, gateway 122 sends the page over a channel of each beam of the first group of beams. Further, in a preferred embodiment, gateway 122 sends user terminal 124 a page over a paging channel of each of the first group of beams.

The first group of beams can consist of one beam or multiple beams. Additionally, the first group of beams may be produced by the same satellite or by multiple satellites. For example, the first group of beams may include two beams of the same satellite if first location 520 is located at the edge of two beams produced by that satellite. Further, if footprints of different satellites overlap, as they do in FIG. 5A, the first group of beams can include beams produced by different satellites. More specifically, for the example of FIGS. 5A–5C, the first group includes beam 405 (produced by satellite 116) and beam 510 (produced by satellite 530).

It is noted that step 608 of sending a page from gateway 122 to user terminal 124 does not include the step of user terminal 124 receiving the page. Further, step 608 does not imply that user terminal 124 is located within a geographic region where it is capable of receiving the page (that is, the paging signal may be out of range of the user terminal, or the signal transfer path may be blocked). What occurs in step 608 is gateway 122 sends a page over one or more beam channels which gateway 122 hypothesizes user terminal 124 is within. Thus, as discussed below, gateway 122 does not know whether user terminal 124 received the page until user terminal 124 sends a message to gateway 122 acknowledging receipt of the page.

Figure 7:
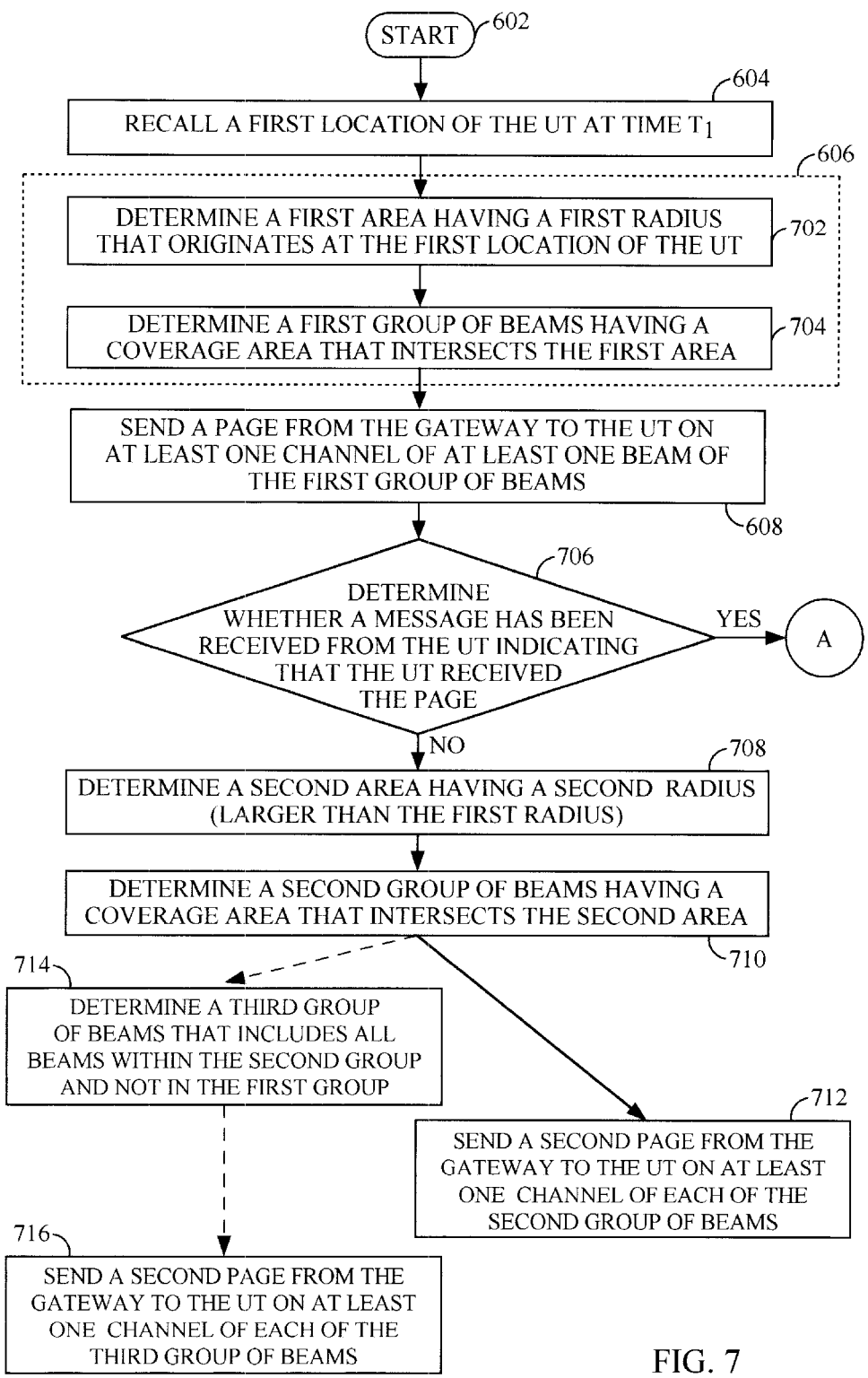
FIG. 7 is a flowchart depicting additional features of the operation of the present invention according to a preferred embodiment.

The flowchart of FIG. 7 illustrates additional features of the present invention. Steps 702 and 704 expand upon how the first group of beams is determined in step 606. With reference to FIGS. 5A–5C, in step 702, a first area 522 is determined. First area 522 has a radius 524 which originates at first location 520. Radius 524 can have a fixed predetermined value, such as 100 miles. Alternatively, radius 524 can be a function of the time period between time $t_1$ and time $t_2$. An example algorithm for determining radius 524 is:

$$R = (t_2 - t_1) \times D$$

where

R is radius 524;

$t_2 - t_1$ is the time period (in hours) since user terminal 124 was located at first location 520; and D is the maximum distance that it is assumed user terminal 124 could have traveled in one hour (for example, at a velocity of 60 miles an hour).

Using this example algorithm, if the time period between time $t_1$ and time $t_2$ is 2 hours, and D is assumed to be 60 miles in one hour, then R is 120 miles. Of course, D can have another predetermined value or can be specific to each user terminal, as would be understood by those skilled in the art.

After the first area is determined, beams having a coverage area that intersects the first area are determined in step 704. As discussed above, this is determined using knowledge of the satellite constellation, including the beam coverage areas of the satellites at different points in time. These beams are the first group of beams over which a page will be sent in step 608. For the example of FIGS. 5A–5C, the first group of beams includes beams 405 and 510.

Next in step 608, discussed in more detail above, gateway 122 sends a page over a channel of at least one beam of the first group of beams. In a preferred embodiment, gateway 122 sends a page over a paging channel of each beam of the first group of beams.

If user terminal 124 receives the page it sends an acknowledgment message to gateway 122 indicating that it has received the page. In a preferred embodiment, user terminal 124 sends this acknowledgment message as an access probe over an access channel that is associated with the paging channel over which user terminal 124 received the page.

In step 706, a determination is made as to whether an acknowledgment indicating receipt of the page has been received from user terminal 124. If the answer is YES, then processing continues to "A" and user terminal 124 has been successfully paged by gateway 122.

As discussed above, gateway 122 may calculate the location of user terminal 124 based on either the characteristics of the acknowledgment message and/or the information included in the acknowledgment message. Once gateway 122 has determined the location of user terminal 122, a table including the locations of user terminals at different points in time can be updated. Further, the location information may be forwarded to another facility, such as a centralized control center or a truck dispatcher facility, for example.

Of course the page could have been sent for a reason other than requesting a position update, such as to notify user terminal 122 that a voice call or data transmission of some type (visual message, facsimile, and so forth) is being sent. If this is the case, once gateway 122 receives an acknowledgment from user terminal 124, gateway 122 can send an additional page which instructs user terminal 124 to switch to a specific traffic channel to thereby receive the voice call. A person skilled in the relevant art will recognize that a page may have been used for other purposes, or to indicate the desire to transfer a variety of non-voice signals, without departing from the spirit and scope of the present invention.

If the answer to the determination made in step 706 is NO, then processing continues to a step 708. In step 708, a second area 526 having a second radius 528 is determined. Second area 528 is drawn larger than first area 524 to expand the paging area for a second attempt at paging user terminal 124.

In step 710 a second group of beams, designated $g_2$, having a coverage area that intersects a second area 528 is determined. Because first area 524 is completely within second area 528, as illustrated in FIGS. 5A–5C, every beam in the first group of beams is included in the second group of beams. However, the present invention does not require the second area to include entirely all of the same beams from the first area. Because second area 528 is larger than first area 524, additional beams may be in the second group of beams that are not in the first group of beams, as is generally the case. As discussed above, the first group of beams includes beams 405 and 510. Referring again to FIGS. 5A–5C, the second group of beams includes beams 405 and 510 as well as beams 401, 404, 414 and 502.

In one embodiment, once the second group of beams has been determined then a second page is sent from the gateway on at least one channel (preferably a paging channel) of each of the second group of beams, in step 712. As stated earlier, each beam typically employs a single paging channel for efficiency, and the page in the second group is made over a channel in at least one beam.

In some situations, an assumption can be made that since an acknowledgment of the first page was not received from user terminal 124, then user terminal 124 was not within the geographic region covered by the first group of beams. This can be done where it is generally not likely that signal reception for the user terminal is simply blocked, such as by physical objects, buildings, etc. When making this assumption, the number of channels used to send the second page can be reduced by only sending a page over beams that are in the second group of beams but not in the first group of beams. More specifically, in this alternative embodiment a third group of beams, designated $g_3$, that includes all the beams within the second group of beams and not in the first group of beams is determined, in step 714. In the example of FIGS. 5A–5C the third group of beams includes only beams 401, 404, 414 and 502. Once the third group of beams is determined, a second page is sent from the gateway on a channel (preferably a paging channel) of each of the third group of beams. However, for most communication systems this latter approach is not as desirable since signal blockage is a reasonably likely reason a user terminal may not respond to a page. Therefore, excluding the first area beams may preclude successful establishment of a link without a great deal of delay or further altering of the paging process.

If gateway 122 does not receive a message from user terminal 124 acknowledging receipt of the second page a third larger area can be determined and another group of beams can be used to page user terminal 124. Additionally, the system can be designed to flood page user terminal 124 after a predetermined number of unsuccessful attempts to page using the reduced number of paging channels.

The present invention can reduce the number of paging channels used to page a user terminal by an order of magnitude. Conventional satellite communications systems often page a user terminal over as many as thirty paging channels. The present invention can page a user terminal using on the order of only two or three channels. Of course the exact number of paging channels used depends on many factors including the satellite constellation of the communications system and the specific point in time that a page is being sent, as would be known.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What I claim as my invention is:

1. In a satellite communications system having at least one gateway and at least one satellite, wherein the satellite produces a plurality (n) of beams and each beam includes a plurality of channels, a method for paging a user terminal (UT), comprising the steps of:

recalling a location of the UT corresponding to a location of the UT at a first time $t_1$;

determining a group ($g_1$) of beams which covers said location of the UT at a second time $t_2$, where $g_1 < n$ and $t_2 > t_1$ by determining an area having a defined radius originating at said UT location;

determining which beams have a coverage area that intersects said defined radius area; and sending a page from the gateway to the UT on a channel of at least one beam that intersects said defined radius area.

2. The method of claim 1, wherein the step of determining said defined radius comprises;

determining a time period between said time $t_1$ and said time $t_2$; and determining said defined radius as a function of said time period.

3. The method of claim 1, further comprising the step of:

determining whether the gateway has received an acknowledgment message from the UT indicating that the UT has received said page.

4. The method of claim 3, further comprising the steps of:

determining a second area having a second radius if the gateway does not receive said acknowledgment message from the UT within a predetermined amount of time, said second radius originating at said UT location and defining a second area larger than the first area of defined radius; and determining a second group ($g_2$) of beams having a coverage area that intersects said second area, where $g_2<n$.

5. The method of claim 4, further comprising the step of:

sending a second page from the gateway to the UT on a channel of each of said second group of beams.

6. The method of claim 4, further comprising the steps of:

determining a third group ($g_3$) of beams, where $g_3<n$, said third group including all beams within said second group and not in the first group; and sending a second page from the gateway to the UT on a channel of each of said third group of beams.

7. In a satellite communications system having at least one gateway and at least one satellite, wherein the satellite produces a plurality (n) of beams and each beam includes a plurality of channels, apparatus for paging a user terminal (UT), comprising:

means for recalling a location of the UT corresponding to a location of the UT at a first time $t_1$;

means for determining a group ($g_1$) of beams which covers said location of the UT at a second time $t_2$, where $g_1<n$ and $t_2>t_1$, said means for deter said group of beams including:

means for determining an area having a defined radius, said radius originating at said location, and means for determining which beams have a coverage area that intersects said area of defined radius; and means for sending a page from the gateway to the UT on a channel of at least one beam that intersects said defined radius area.

8. The apparatus of claim 7, wherein the means for determining said defined radius comprises:

means for determining a time period between said time $t_1$ and said time $t_2$; and means for determining said defined radius as a function of said time period.

9. The apparatus of claim 7, further comprising:

means for determining whether the gateway has received an acknowledgment message from the UT indicating that the UT has received said page.

10. The apparatus of claim 9, further comprising:

means for determining a second area having a second radius if the gateway does not receive said acknowledgment message from the UT within a predetermined amount of time, said second radius originating at the first location and defining a second area larger than the first area of defined radius; and means for determining a second group ($g_2$) of beams having a coverage area at intersects said second area, where $g_2<n$.

11. The apparatus of claim 10, further comprising:

means for sending a second page from the gateway to the UT on at least one channel of each of said second group of beams.

12. The apparatus of claim 10, further comprising:

means for determining a third group ($g_3$) of beams, where $g_3<n$, said third group including all beams within said second group and not in the first group; and means for sending a second page from the gateway to the UT on a channel of each of sad third group of beams.

13. The apparatus of claim 12, further comprising:

means for receiving an acknowledgment message sent from the UT indicating that the UT has received said page; and means for determining a second location of the UT based on said acknowledgment message sent from the UT to the gateway, said second location corresponding to a location of the UT at time $t_2$.

14. The apparatus of claim 13, wherein the means for determining said second location comprises:

means for determining said second location based on characteristics of said acknowledgment message.

15. The apparatus of claim 14, wherein the means for determining said second location of the UT based on said characteristics of said acknowledgment message comprises:

means for determining said second location of the UT based on a least one of Doppler delay and time delay of said acknowledgment message.

16. The apparatus of claim 7, wherein said page sent from the gateway to the UT comprises a location update request.

17. The apparatus of claim 16, further comprising:

a database for storing said second location of the UT.

18. The apparatus of claim 17, further comprising:

means for forwarding said second location of the UT to a dispatcher.

* * * * *